United States Patent
Ostahowski et al.

(10) Patent No.: US 7,182,859 B2
(45) Date of Patent: Feb. 27, 2007

(54) APPARATUS FOR TREATING ORGANIC WASTE

(75) Inventors: Jeffery L. Ostahowski, Edenville, MI (US); Ronald L. Panter, Flushing, MI (US)

(73) Assignee: PMC Environmental Technologies, LLC, Mt. Morris, MI (US)

( * ) Notice: Subject to any disclaimer, the term of this patent is extended or adjusted under 35 U.S.C. 154(b) by 337 days.

(21) Appl. No.: 10/737,502

(22) Filed: Dec. 16, 2003

(65) Prior Publication Data

US 2005/0126971 A1   Jun. 16, 2005

(51) Int. Cl.
 *C02F 1/02* (2006.01)
 *C02F 1/74* (2006.01)
(52) U.S. Cl. .................. 210/149; 210/177; 210/205; 210/258
(58) Field of Classification Search .............. 210/149, 210/177, 187, 197, 258, 532.2, 538, 539, 210/612, 613, 628, 629, 416.1, 205, 220
See application file for complete search history.

(56) References Cited

U.S. PATENT DOCUMENTS

| | | | | |
|---|---|---|---|---|
| 3,196,105 A | * | 7/1965 | Schneider | 210/608 |
| 3,388,057 A | * | 6/1968 | Callahan | 210/603 |
| 3,662,890 A | * | 5/1972 | Grimshaw | 210/195.1 |
| 4,002,561 A | * | 1/1977 | Traverse | 210/621 |
| 4,940,539 A | * | 7/1990 | Weber | 210/149 |
| 5,948,261 A | * | 9/1999 | Pressley | 210/609 |
| 6,187,193 B1 | * | 2/2001 | Ozama | 210/608 |

* cited by examiner

*Primary Examiner*—Matthew O. Savage
(74) *Attorney, Agent, or Firm*—Gifford, Krass, Groh, Sprinkle, Anderson & Citkowski, P.C.

(57) ABSTRACT

An apparatus for treating organic waste. The apparatus includes a tank having an interior chamber. A weir having a lower opening is disposed in the tank and this weir divides the tank into an inlet chamber and an outlet chamber. The inlet chamber receives organic waste and an outlet discharges liquid to a waste disposal system from the outlet chamber. Microbes capable of biodegrading organic waste are introduced into the inlet chamber. A pump recirculates liquid from the bottom of the inlet chamber to the top of the inlet chamber.

11 Claims, 1 Drawing Sheet

APPARATUS FOR TREATING ORGANIC WASTE

BACKGROUND OF THE INVENTION

I. Field of the Invention

The present invention provides an apparatus for treating organic waste.

II. Description of Related Art

Restaurants and other business establishments that process food, as well as manufacturing facilities, typically generate a great amount of organic waste. This organic waste includes not only ground food particles, but also grease, fat, oils, lipids, cutting oils, cellulose materials and the like, hereinafter collectively referred to as "organic waste".

If such business establishments were to discharge the organic waste directly into a sewage system, the sewage system would rapidly become clogged with the organic waste. Consequently, many municipalities forbid such business establishments from directly discharging such waste, and essentially grease, into the sewage system.

In order to comply with these governmental regulations, many businesses which generate organic waste pretreat the organic waste in a "grease trap" before flushing organic waste into the sewage system. The grease trap is typically a tank having an interior chamber. A weir is disposed within the tank and divides the tank into an inlet chamber and an outlet chamber.

The organic waste is introduced into the top of the inlet chamber while an outlet open to the top of the outlet chamber is fluidly connected to the waste disposal or sewage system. An opening in the weir near the bottom of the tank and at a position below the inlet and outlet fluidly connects the inlet chamber to the outlet chamber.

In practice, as the organic waste is introduced into the inlet chamber, both the inlet and outlet chamber fill to a liquid level equal to the liquid level of the outlet from the outlet chamber. Organic waste such as oils, fats, greases, and similar substances not only does not dissolve within water but is also less dense than water. As such, this organic waste floats to the top of the inlet chamber of the tank.

Microbes capable of biodegrading the organic waste are then introduced into the inlet chamber of the tank. In the ideal situation, these microbes degrade the organic waste, after which the now degraded organic waste flows through the weir opening, to the outlet chamber and ultimately to the waste disposal system.

These previously known grease traps, however, have not proven highly effective in biodegrading the organic waste within the inlet chamber of the tank for a number of reasons. One reason is that the microbes introduced into the inlet chamber tend to conglomerate within certain regions of the inlet chamber leaving other regions with insufficient microbes to completely degrade the organic waste. In other situations, the temperature of the material contained within the grease trap is too low or too cold and thus insufficient to promote biodegradation of the organic waste within the grease trap.

As a result, these previously known grease traps must disadvantageously be cleaned on a regular basis to remove excess grease and other undegraded organic waste. Such periodic cleaning of the grease trap, however, is both expensive and labor extensive. Furthermore, unless the grease trap is routinely cleaned, undegraded organic waste may flow directly from the inlet chamber to the outlet chamber of the grease trap and directly to the sewage disposal system. The introduction of untreated or undertreated organic waste into the sewage disposal system may clog the damaged sewage disposal system or create other damage to the sewage disposal system and/or health hazards.

SUMMARY OF THE PRESENT INVENTION

The present invention provides an apparatus for treating organic waste which overcomes all of the above-mentioned disadvantages of the previously known devices. In brief, the apparatus of the present invention comprises a tank having an interior chamber. A weir is disposed within the tank which divides the tank into an inlet chamber and an outlet chamber.

The tank includes an inlet adapted to receive organic waste and that inlet is open to the top of the first chamber. Similarly, the tank includes an outlet adapted to discharge liquid to a waste disposal or sewage system and that outlet is open to the outlet chamber also adjacent its top. Furthermore, the weir includes an opening near its bottom to fluidly connect the inlet and outlet chambers together and this opening is positioned below the outlet from the outlet chamber.

Microbes capable of biodegrading organic waste are then introduced into the inlet chamber of the tank. Consequently, as the organic waste enters the inlet chamber of the tank, the level of the organic waste within the tank will rise to the liquid level of the outlet.

In order to promote the biodegradation of the organic waste within the inlet chamber, the apparatus of the present invention includes a pump having its inlet open to the inlet chamber adjacent its bottom and one outlet open to the inlet chamber adjacent its top and a second outlet below liquid level. Consequently, upon activation of the pump, the pump continually recirculates the organic waste within the interior chamber of the tank from its bottom to its middle and to its top thereby enhancing the distribution of microbes within the tank inlet chamber. This in turn enhances the degradation of the organic waste within the interior chamber.

The apparatus further includes a heater which is contained within the interior chamber. A control circuit monitors the temperature of the material within the interior chamber via a temperature sensor and then selectively activates the heater to maintain the temperature of the inlet chamber within a predetermined temperature range. Furthermore, this temperature range is selected to enhance the biodegrading action of the microbes or the organic waste.

Additionally, an air vent has an inlet end open to ambient air outside the tank inlet chamber and a second end open to the interior chamber below liquid level. This air vent thus introduces oxygen into the interior chamber of the tank and also aerates the organic waste in the first chamber. This introduction of oxygen from ambient air enhances the biodegradation of the organic waste.

Preferably, a recirculating pump contained within the outlet chamber and this second pump operate in substantially the same fashion in the outlet chamber as the first pump operates in the inlet chamber. Although ideally any liquid passing through the weir from the inlet chamber and to the outlet chamber is completely biodegraded, in practice some organic waste typically escapes from the inlet chamber and to the outlet chamber. Consequently, the second pump, together with a second air vent, provide a second level of treating the organic waste within the apparatus. This in turn minimizes the discharge of untreated organic waste from the tank and into the sewage or waste disposal system.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
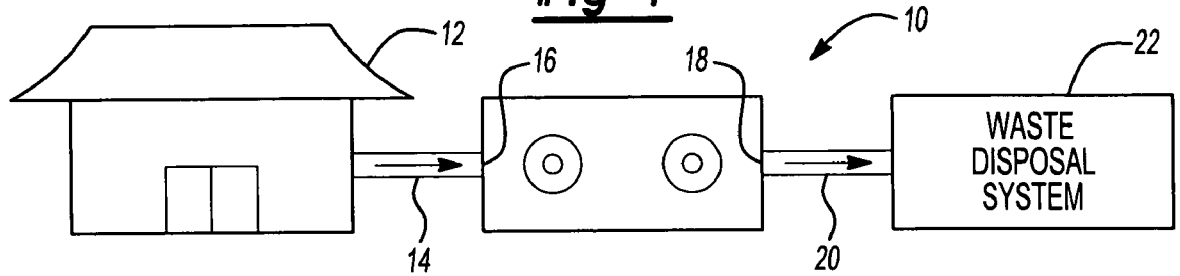
FIG. 1 is a diagrammatic view illustrating a preferred embodiment of the present invention.

With reference first to FIG. 1, a preferred embodiment of the apparatus 10 for treating organic waste is illustrated diagrammatically. The apparatus 10 is used in conjunction with a business 12, such as a restaurant or manufacturing facility, that generates organic waste as a byproduct. The business 12 discharges its organic waste through a discharge pipe 14 to an inlet 16 of the apparatus 10. This organic waste typically contains oils, greases, fats, as well as other types of organic waste.

Still referring to FIG. 1, after treatment of the organic waste by the apparatus 10 as will be hereinafter described in greater detail, the now treated organic waste is then discharged through an outlet 18 of the apparatus 10, through a discharge pipe 20 and to a waste disposal system 22 (illustrated only diagrammatically) such as a municipal sewage treatment facility.

Figure 2:
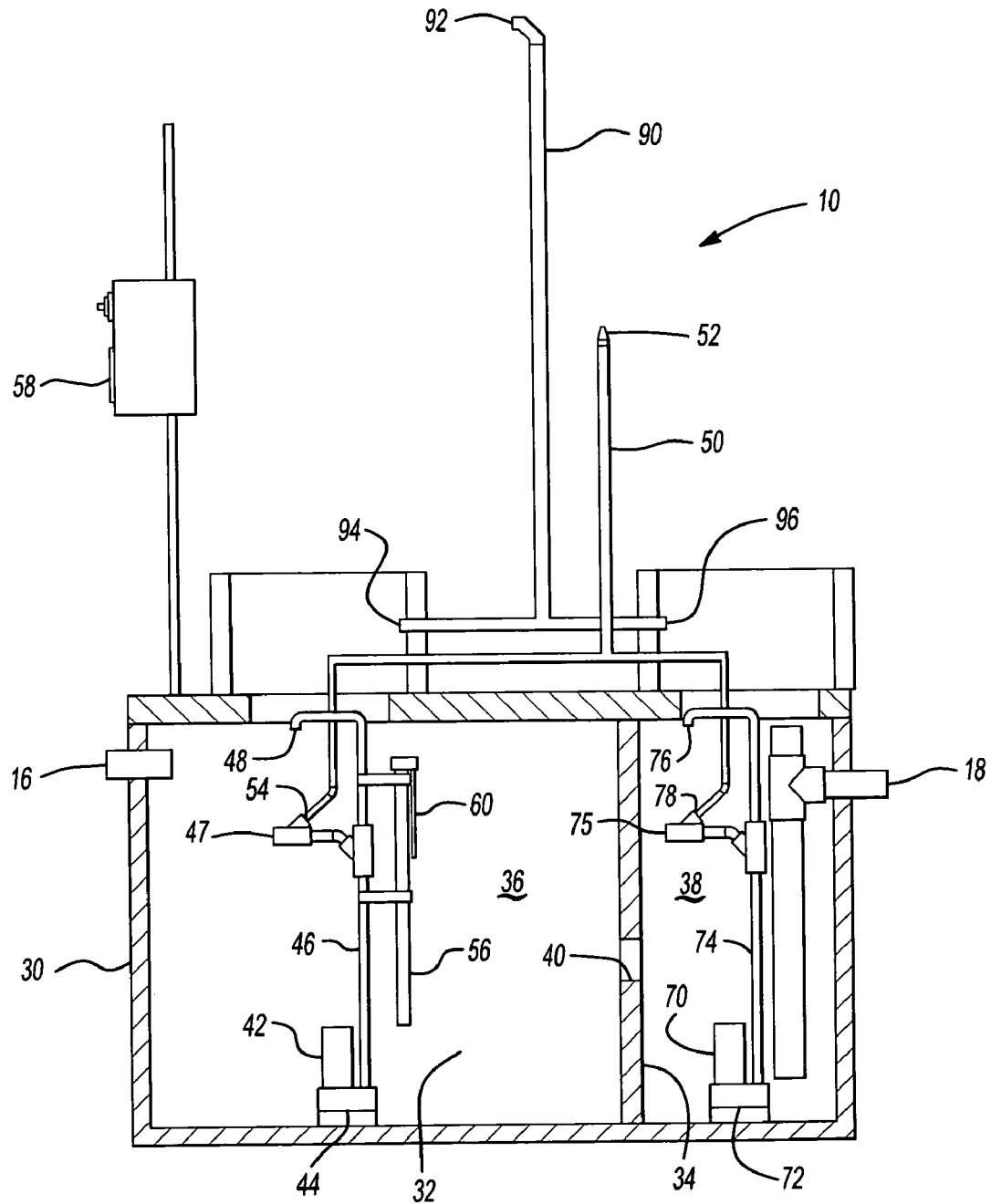
FIG. 2 is a sectional view illustrating the preferred embodiment of the present invention.

With reference now to FIG. 2, the apparatus 10 is there shown in greater detail and includes a tank 30 having an interior chamber 32. A weir 34 is positioned within the tank 30 and divides the tank chamber 32 into an inlet chamber 36 and an outlet chamber 38. The apparatus inlet 16 is open to the inlet chamber 36 adjacent its top while, similarly, the outlet 18 is open to the outlet chamber 38 also adjacent its top. An opening 40 fluidly connects the inlet chamber 36 to the outlet chamber 38 and this opening 40 is positioned below the outlet 18 and near the bottom of the weir 34.

A liquid pump 42 includes an inlet 44 which is open to the inlet chamber 36 adjacent its bottom. The outlet from the pump 42 is fluidly connected through a conduit 46 and to outlet 47 in the middle of chamber 36 and to a spray head 48 adjacent the top of the inlet chamber 36 and above the fluid level of the outlet 18. Consequently, upon activation of the pump 42, the pump 42 circulates liquid within the interior chamber 36 from the bottom of the chamber 36, through the conduit 46, and through outlet 47 to the middle of chamber 36 and spray head 48 to the top of the inlet chamber 36.

An elongated air intake vent 50 has one end 52 open to ambient air exteriorly of the tank chamber 32. A second end 54 of the air vent 50 is open to the inlet chamber 36 below liquid level, fluidly connected to the conduit 46 immediately upstream from the outlet 47. Consequently, upon actuation of the pump 42, ambient air is inducted through the air vent 50 by venturi action of the liquid flow through the conduit 46 to outlet 47.

A heater, preferably an electric heater, is disposed within the inlet chamber 36. A control circuit 58, which may be of any conventional construction, receives an input from a temperature sensor 60 within the inlet chamber 36 and controls the activation of the heater 56. The control circuit 58 activates the heater 56 in an amount or duty cycle sufficient to maintain the temperature of the material within the inlet chamber 36 within a predetermined temperature range. The control circuit 58 also controls the activation of the pump 42.

Microbes capable of biodegrading organic waste are introduced into the inlet chamber 36. Thus, as organic waste is introduced through the inlet 16 and into the inlet chamber 36, the microbes biodegrade the organic waste in the desired fashion. Furthermore, the control circuit 58 maintains the temperature of the inlet chamber 36 at a temperature designed to enhance and preferably optimize the biodegradation of the organic waste in the desired fashion.

A second liquid pump 70 is disposed within the outlet chamber 38. This second pump 70 has an inlet 72 open to the outlet chamber 38 adjacent its bottom. The outlet from pump 70 is fluidly connected through a conduit 74 and to outlet 75 in the middle of chamber 38 and to a spray head 76 adjacent to the top of outlet chamber 38 and above the liquid level of outlet 18. Consequently, upon activation of pump 70, the pump 70 circulates the liquid within the interior chamber 38 from the bottom of chamber 38, through the conduit 74, and through outlet 75 to the middle of chamber 38 and spray head 75 to the top of outlet chamber 38. An elongated air intake vent 50 has one end 52 open to ambient air exteriorly of the tank chamber 32. A third end 78 of the air vent 38 is open to the inlet chamber 38 below liquid level, fluidly connected to the conduit 74 immediately upstream from the outlet 75. Consequently, upon actuation of the pump 70, ambient air is inducted through the air vent 50 by venturi action of the liquid flow through the conduit 74 to outlet 75. Consequently, upon actuation of the pump 70, ambient air is inducted through air vent 50 by venturi action of the liquid flow at connection 78 through the conduit 74 to outlet 75.

In practice, the pumps 42 and 70 respectively continuously circulate the material within the inlet chamber 36 and outlet chamber 38 in order to ensure an even distribution of the microbes within the inlet chamber 36 and outlet chamber 38. Furthermore, the control circuit 58 maintains the temperature of both the inlet chamber 36 and outlet chamber 38 by selective activation of the heater 56 within a predetermined range, e.g. 85° F.–90° F., designed to enhance the biodegrading activity of the microbes within the chambers 36 and 38. The air vent 50 also ensures that the supply of oxygen to the interior tank chamber 32 is continuously replenished thereby further enhancing the biodegrading activity of the microbes within the tank chamber 32.

An elongated air discharge vent 90 has one end 92 open to ambient air exterior of tank chamber 36 adjacent its top. A third end 96 of the air discharge vent is open to the outlet chamber 38 adjacent its top. Thus, any positive air pressure in the interior chamber 32 will be discharged through air discharge vent 90 at the open end 92 to ambient air exterior of the tank chamber 32.

In practice, it has been found that the apparatus of the present invention is capable of biodegrading organic waste at a sufficient high rate so that the periodic cleaning of the tank is rendered unnecessary or only infrequently necessary. Indeed, with the present invention, a steady state operation of treatment of the organic waste can be achieved for many apparatuses.

From the foregoing, it can be seen that the present invention provides a simple, and yet effective, apparatus for treating carbon waste. Having described our invention, however, many modifications thereto will become apparent to those skilled in the art to which it pertains without deviation from the spirit of the invention as defined by the scope of the appended claims.

We claim:

1. An apparatus for treating organic waste comprising:
a tank having an interior chamber,
a weir disposed in said tank, said weir dividing said tank into an inlet chamber and an outlet chamber,
said tank having an inlet adapted to receive organic waste, said inlet open to said first chamber adjacent a top of said inlet chamber,
said tank having an outlet adapted to discharge liquid to a waste disposal system, said outlet adjacent a top of said outlet chamber,
said weir having an opening positioned below said inlet and said outlet which fluidly connects said inlet and outlet chambers,
microbes capable of biodegrading organic waste in said inlet chamber,
a pump having an inlet open to said inlet chamber adjacent a bottom of said inlet chamber and an outlet open to said inlet chamber adjacent a top of said inlet chamber,
wherein upon activation, said pump circulates liquid contained in said inlet chamber from the bottom of said inlet chamber and to the top of said inlet chamber and below a liquid level of said inlet chamber.

2. The invention as defined in claim 1 and comprising an air vent open at one end to ambient air exterior to said chamber and at a second end to said inlet chamber.

3. The invention as defined in claim 1 and comprising a spray head fluidly connected in series with said pump outlet.

4. The invention as defined in claim 3 and comprising a venturi outlet disposed in the inlet chamber and connected to the pump outlet, and an air vent open at one end to ambient air exterior to said chamber and at a second end to said venturi outlet below said liquid level.

5. The invention as defined in claim 1 and comprising a heater contained in said inlet chamber.

6. The invention as defined in claim 5 and comprising a control circuit which controls activation of said heater, a temperature sensor disposed in said inlet chamber, said temperature sensor having an output signal connected as an input signal to said control circuit, said control circuit selectively activating said heater in response to said input signal from said temperature sensor in an amount sufficient to maintain material in said inlet chamber within a predetermined temperature range.

7. The invention as defined in claim 1 and comprising a second pump having an inlet open to said outlet chamber adjacent a bottom of said outlet chamber and an outlet open to said outlet chamber adjacent a top of said outlet chamber and an outlet open to said outlet chamber below a liquid level of said outlet chamber wherein, upon activation, said second pump circulates liquid contained in said outlet chamber from the bottom of said outlet chamber and to the top of said outlet chamber and below the liquid level of said outlet chamber.

8. The invention as defined in claim 7 and comprising an air vent having one end open to ambient air exterior of said tank chamber and a second end open to said outlet chamber.

9. The invention as defined in claim 7 and comprising a second spray head fluidly connected to the second pump outlet.

10. The invention as defined in claim 7 and comprising a second venturi outlet disposed in the outlet chamber and connected to the second pump outlet, and a second air vent open at one end to ambient air exterior to said chamber and at a second end to said second venturi outlet below the liquid level of the outlet chamber.

11. The invention as defined in claim 1 wherein said pump has a second outlet open to said inlet chamber below a liquid level of said inlet chamber.

* * * * *